Figure 1:
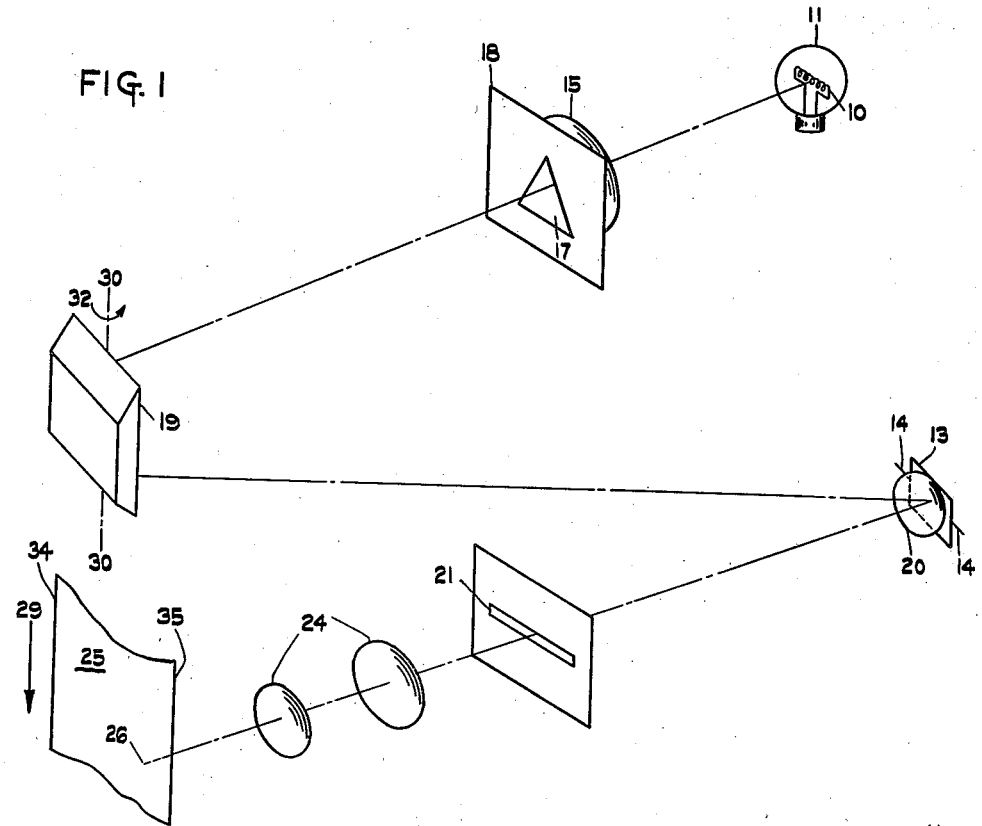

April 1, 1941. A. S. BLUMENFELD 2,236,990
MEANS FOR ADJUSTING OPTICAL SYSTEMS
Filed Aug. 2, 1940 2 Sheets-Sheet 1

INVENTOR
ALEXANDER S. BLUMENFELD
BY Otto J. Nathansohn
AGENT

April 1, 1941.   A. S. BLUMENFELD   2,236,990
MEANS FOR ADJUSTING OPTICAL SYSTEMS
Filed Aug. 2, 1940   2 Sheets—Sheet 2
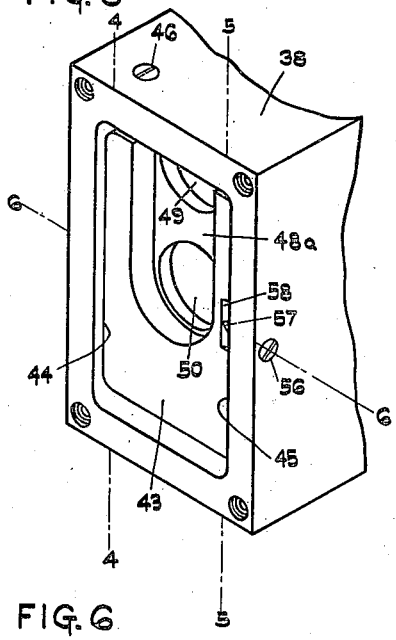
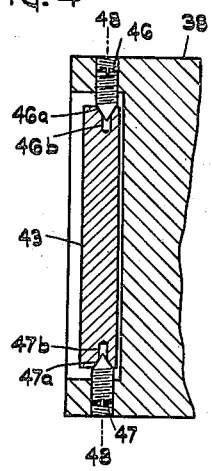
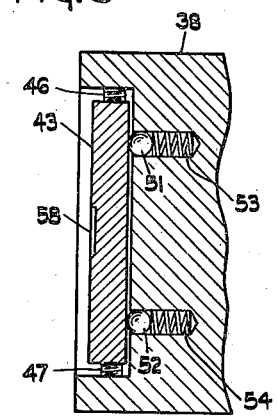
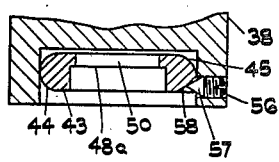
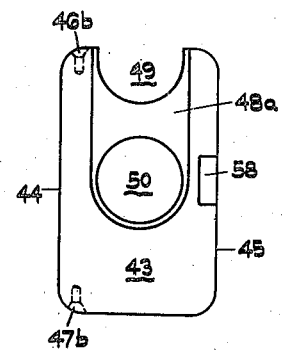
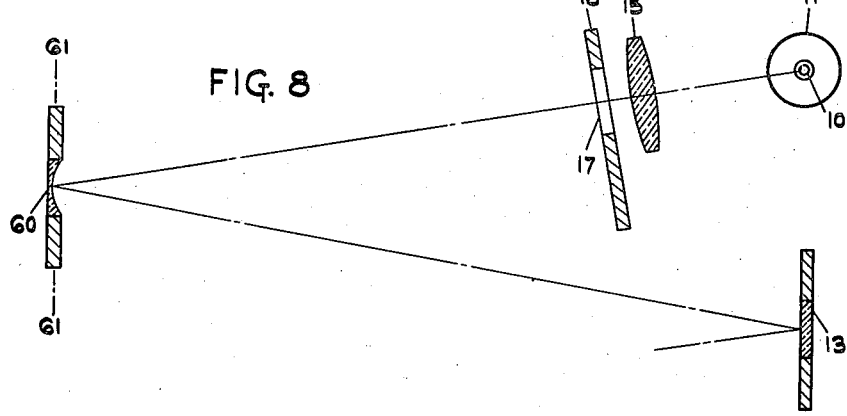
INVENTOR
ALEXANDER S. BLUMENFELD.
BY Otto J. Nathansohn
AGENT Patented Apr. 1, 1941

2,236,990

UNITED STATES PATENT OFFICE 2,236,990

MEANS FOR ADJUSTING OPTICAL SYSTEMS

Alexander S. Blumenfeld, New York, N. Y., assignor, by mesne assignments, to J. A. Maurer, Inc., a corporation of New York Application August 2, 1940, Serial No. 349,761

3 Claims. (Cl. 179—100.3)

This invention relates to optical systems for the recording, by means of a light beam, of electrical impulses on a moving film such as are used in sound recording, picture transmission, and the like. More particularly, the invention relates to means for adjusting such optical systems.

In an optical system of the type described the various parts of which it is made up must be aligned with respect to each other, and the entire optical system must then be so directed that the light beam proceeding through it is incident on the proper part of the film. This light beam may be considered to be composed of a number of light rays, the central one of which strikes the film at the recording point.

It has hitherto been a drawback that adjusting the position of the recording point on the film involved moving the entire optical system with respect to the film or moving the film with respect to the optical system. It is therefore an object of the invention to provide in optical systems of the type described simple and efficient means whereby the position of the recording point on the film can be adjusted without moving the entire optical system or the film.

Another object of the invention is the provision of means for adjusting the position of the recording point on the film which can be incorporated easily and inexpensively in an optical system of the type described.

Another object of the invention is the provision, in an optical system of the type described, of such means which are easily accessible.

Another object of the invention is the provision of an optical system of the type described which can be quickly and easily transferred from one piece of apparatus to another.

Still other objects and advantages of the invention include those which are hereinafter stated or apparent or which are incidental to the invention.

The objects of the invention are substantially achieved by providing, in an optical system of the type described, reflecting means acting on the light beam and rotatable about an axis which extends in a direction substantially parallel to the direction in which the film moves at the recording point. By means of these rotatable reflecting means the position of the recording point on the film can be adjusted by displacing it in a direction at right angles to the direction of the film motion at the recording point, and without moving the entire optical system or the film.

The direction in which the film moves at the recording point and directions parallel to it will be called vertical throughout the present specification, and directions at right angles to both a vertical direction and the path of the central light ray through the optical system will be called horizontal. Planes at right angles to the vertical direction will be called horizontal planes, and planes at right angles to the horizontal direction will be called vertical planes, the vertical planes being at right angles to the horizontal planes.

It will thus be seen that in the present specification the terms "vertical" and "horizontal" will not be used in any absolute sense but merely for distinguishing between two planes or directions which are at right angles to each other, and that choice between these terms has been determined merely by convenience in description and illustration.

The invention will be better understood when the following description is considered with the accompanying drawings of certain presently preferred embodiments thereof, and its scope will be pointed out in the appended claims.

Figure 2:
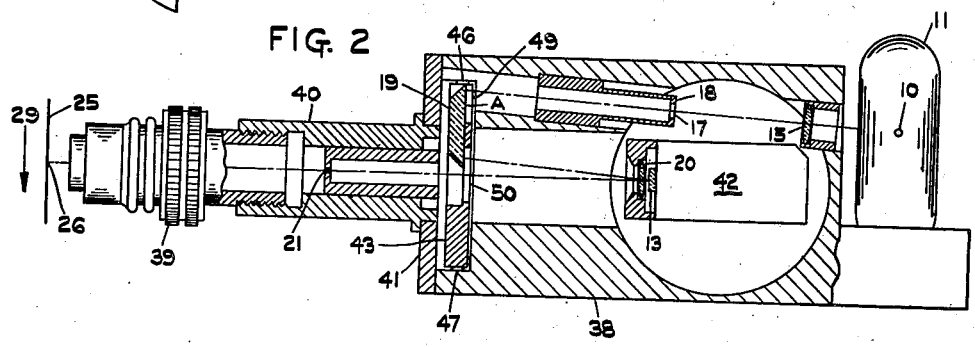

In the drawings:

Fig. 1 is a diagrammatic perspective view of one embodiment of the invention as applied to a conventional optical system for the recording, by means of a light beam, of electrical impulses on a moving film, Fig. 2 is mainly a vertical section and partly a side elevation of a casing in which the optical system of Fig. 1 has been assembled, Fig. 3 is an enlarged perspective view of the left hand end of the casing shown in Fig. 2 after a front plate and a prism have been removed, Fig. 4 is a vertical section on the line 4—4 of Fig. 3, Fig. 5 is a vertical section on the line 5—5 of Fig. 3, Fig. 6 is a horizontal section on the line 6—6 of Fig. 3, Fig. 7 is an enlarged front elevation, as seen from the left hand side of Fig. 2, of a part shown in Figs. 2 to 6, and Fig. 8 is a diagrammatic vertical section of a portion of an optical system, showing another embodiment of the invention.

Referring first to Fig. 1, there is shown, by way of example and in a diagrammatic manner, the application of the invention to a conventional optical system for the recording, by means of a light beam, of electrical impulses on a moving film. Light from a light source such as the filament 10 of an incandescent lamp 11 is directed to the mirror 13 of an oscillograph galvanometer (not shown) or similar device translating electrical impulses into mechanical vibrations. The axis 14—14 about which mirror 13 is mounted to vibrate extends horizontally.

More particularly, the light from lamp filament 10 passes through the condenser lens 15 and the triangular opening 17 in the screen 18, and strikes mirror 13 after it has been reflected by the prism 19 and has passed through the spherical lens 20 in front of mirror 13.

An image of opening 17 is formed in the plane of the slit 21 by spherical lens 20. Vibration of mirror 13 about axis 14—14 moves the image of opening 17 across slit 21 in such a manner as to illuminate more or less of slit 21. Then lens system 24, which may be of the type usually employed as a microscope objective, forms on the film 25 at the recording point 26 an image of slit 21 or as much of it as is illuminated, which image of slit 21 is a horizontal line of light.

When now the electrical impulses to be recorded are applied in known manner to the oscillograph galvanometer on which mirror 13 is mounted, thus causing mirror 13 to vibrate about axis 14—14, the horizontal line of light formed at the recording point 26 varies in length at both its ends in accordance with the electrical impulses. When, furthermore, film 25 moves at the recording point 26 in a substantially vertical direction as indicated by the arrow 29, a symmetrical or bilateral variable width record is produced on film 25.

As has been pointed out hereinabove, the light from lamp filament 10 is reflected by prism 19 to mirror 13 where it is again reflected to film 25. This optical path is indicated by the broken line from lamp filament 10 to film 25, which line represents the central ray of the light beam proceeding through the optical system. This central light ray strikes film 25 at the recording point 26.

It may now be assumed that prism 19 is rotatable about the substantially vertical axis 30—30, and that it is rotated about axis 30—30 in a counter-clockwise direction as indicated by the arrow 32. According to the well known laws of reflection, this rotation of prism 19 results in a counter-clockwise rotation of the portion of the central light ray between prism 19 and mirror 13 and in a clockwise rotation of the portion thereof between mirror 13 and film 25, the rotation of the two portions taking place in substantially horizontal planes. Thus, recording point 26 is shifted horizontally towards the edge 34 of film 25.

Similarly, when prism 19 is rotated in a clockwise direction about axis 30—30, recording point 26 is shifted horizontally towards the edge 35 of film 25.

The above explanation of the effect of rotating prism 19 about the substantially vertical axis 30—30 on the central light ray applies also to the effect of this rotation on the other light rays which constitute the light beam proceeding through the optical system. Hence, when the recording point 26 is shifted towards either edge 34 or edge 35 of film 25, the entire horizontal line of light formed on film 25 is shifted horizontally in the same direction.

It will thus be seen that a reflecting prism which acts on the light beam proceeding through an optical system of the type described, and which is rotatable about an axis substantially parallel to the direction of the film motion at the recording point, is a means for horizontally displacing the recording point on the film which does not involve movement of the entire optical system or of the film.

An embodiment of such a rotatable prism, and its incorporation in an actual optical system of the type described, is shown by way of example in Fig. 2. Fig. 2 is mainly a vertical section and partly a side elevation of a casing 38 in which the optical system of Fig. 1 has been assembled. Except for the objective lens system 24, all the parts of the optical system of Fig. 1 are shown in Fig. 2 and identified by the same reference characters as in Fig. 1. Lens system 24 is inside of the tubular lens mount 39 which has a threaded engagement with the nozzle 40 attached to the front plate 41 of casing 38. In addition, there is shown in Fig. 2 an oscillograph galvanometer 42 on which mirror 13 is mounted. Galvanometer 42 may be of the type disclosed in John A. Maurer, Jr.'s, U. S. specification 2,207,064, and it may be secured to the wall of casing 38 by screws or other suitable means (not shown).

In general, the way in which the individual parts of the optical system are assembled and held in their respective places in casing 38 is well known to those skilled in the art and hence need not be explained here in detail. Prism 19, however, is adapted for rotation about a substantially vertical axis in the following manner:

Prism 19 is cemented to, or mounted in any other suitable manner on, a holder 43, which is shown in Fig. 2 and in more detail in Figs. 3 to 7. Fig. 3 is an enlarged perspective view of the left hand end of casing 38 after front plate 41 and prism 19 have been removed, Figs. 4 to 6 are sections taken on lines 4—4, 5—5, and 6—6 of Fig. 3, and Fig. 7 is an enlarged front elevation of the prism holder 43 itself as seen from the left hand side of Fig. 2.

Prism holder 43 has a substantially rectangular shape and is rotatably mounted in casing 38 so that its opposite edges 44 and 45 are substantially vertical. To that end, screws 46 and 47 (see Figs. 3 and 4), threaded through casing 38, support prism holder 43 by engaging with their conical tips 46a and 47a the conical holes 46b and 47b, respectively, in holder 43. Thus, screws 46 and 47 act as pivots about which holder 43 can be rotated, their axes extending along a substantially vertical line 48—48 near the edge 44 of prism holder 43.

Prism 19 is mounted with its front face A (see Fig. 2) flat against a suitably shaped recess 48a in holder 43 so that it is rotated about axis 48—48 when prism holder 43 is rotated about this substantially vertical axis. Openings 49 and 50 in holder 43 permit the light beam proceeding through the optical system to enter and leave prism 19. The portion of the light beam which after reflection by mirror 13 proceeds toward slit 21 also passes through opening 50 (see Fig. 2).

Two steel balls 51 and 52 (see Fig. 5) are backed by two springs 53 and 54, respectively, which are suitably recessed in casing 38. Steel balls 51 and 52 press against prism holder 43 at two points near edge 45 thus creating a torque for rotating prism holder 43 about screws 46 and 47.

This torque is opposed by the action of adjusting screw 56 (see Figs. 3 and 6) which is threaded through casing 38 and has a conical tip 57 fitting against the inclined edge of the wedge-shaped recess 58 in edge 45 of prism holder 43.

When adjusting screw 56 is rotated clockwise, holder 43, and hence prism 19, is rotated about axis 48—48 in one direction by the action of the conical tip 57 on recess 58. When adjusting screw 56 is rotated counter-clockwise, prism holder 43 is rotated about axis 48—48 in the opposite direction because of the torque created by the pressure of steel balls 51 and 52. Moreover, as long as adjusting screw 56 is in any position in which tip 57 acts on recess 58, holder 43, and hence prism 19, is fixed firmly in any adjusted position about axis 48—48, because the pressure of balls 51 and 52 opposes the action of adjusting screw 56.

Thus, by means of turning adjusting screw 56 which is easily accessible (see Fig. 3) the recording point 26 can be horizontally displaced on film 25 in a simple and efficient manner, as has been pointed out hereinabove. When therefore the unit shown in Fig. 2 has been assembled it can conveniently be put into place in a piece of apparatus such as a sound recorder, while the simple and easily accessible adjustment of the recording point makes it possible to transfer this unit quickly from one piece of apparatus to another.

The invention has been shown and described hereinabove as embodied by way of example in a reflecting prism 19 which is adjustably mounted for rotation about an axis substantially parallel to the direction of the film motion at the recording point. A prism is, however, not the only reflecting means which may be mounted in this manner in order to provide an adjustment for the position of the recording point on the film according to the invention. Furthermore, while prism 19 is an example of a plane reflecting means, as is a plane mirror, non-plane reflecting means may also be employed to achieve the objects of the invention, provided that the effect such means have on the imagery in the optical system in which they are included is taken into account.

Thus, for example, in the optical system shown in Figs. 1 and 2 there may be substituted for prism 19 and spherical lens 20 a concave spherical mirror 60 which is rotatable about a substantially vertical axis 61—61, and performs also the function of lens 20. Such an optical system is shown by way of example in a diagrammatic vertical section in Fig. 8, from which diagram the portion of the optical path from mirror 13 to film 25 has been omitted because it is identical with the corresponding portion of Fig. 1.

It will be understood, however, that a concave mirror which is cylindrical may also be mounted for rotation about a substantially vertical axis, if it is desired to displace the recording point horizontally in an optical system whose imagery requires that the concave mirror act in a particular plane only. In still other optical systems, the non-plane mirror could also be convex and vertically rotatable. For example, the concave cylindrical mirror 45 shown in Fig. 15 of John A. Maurer, Jr.'s, co-pending application Ser. No. 343,617, or the convex cylindrical mirror which may be substituted for it according to the disclosure of application Ser. No. 343,617, may be adjustably mounted for rotation about a substantially vertical axis in accordance with the present invention.

While prism holder 43 has been shown and described hereinabove as having a substantially rectangular shape, it may have any other shape, consistent with its function, by which it may conveniently be fitted into the particular mechanical design of an optical system. Holder 43 furthermore may easily be adapted to hold any other reflecting means than prism 19, for example mirror 60, as will readily be understood by those skilled in the art. In some of these adaptations it may be necessary to modify openings 49 and 50 so that the light beam proceeding through the optical system may enter and leave at the appropriate places, but these modifications may be effected without altering the essential features of holder 43 and the manner in which it is adjustably mounted for rotation about a substantially vertical axis in casing 38.

The reflecting means employed according to the invention for the adjustment of the position of the recording point by horizontally displacing it on a film which moves at the recording point in a substantially vertical direction, may be placed in any position where their action on the light beam proceeding through the optical system results in this displacement. For example, in an optical system of the type shown in Fig. 1, the vertically rotatable reflecting means may be placed in any position between screen 18 and film 25. If, however, they are placed at some position between slit 21 and film 25, an additional means of adjustment may be provided whereby slit 21 can be rotated about the path of the central light ray, or an axis parallel to it, so that the line of light formed on film 25 may remain horizontal when the position of the recording point 26 on film 25 is adjusted.

The invention has been shown and described as part of a conventional optical system for producing symmetrical variable width records. It may, however, be incorporated in any other optical system for the recording, by means of a light beam, of electrical impulses, since in all such systems there is some position along the optical path at which the rotatable reflecting means can be placed. The invention may be applied, for example, to optical systems in which the opening in screen 18 is a right-angled triangle, or a rectangle, or in which it has any other desired shape. The axis of vibration of mirror 13 may extend horizontally as does axis 14—14 in Fig. 1, or it may extend vertically, or in any other desired direction. Furthermore, the number and optical constants of the lenses which are employed in any given optical system are immaterial for the application thereto of the adjusting means according to the invention. Likewise, it is immaterial if instead of a mirror oscillograph, as in the optical systems of Figs. 1 and 2, and 8, a string oscillograph or light valve, or another means for modulating a light beam in accordance with electrical impulses, is employed in the optical system to which the invention is to be applied. Finally, since a reflecting prism, such as prism 19 shown in Figs. 1 and 2, affects the imagery of an optical system only in so far as it affects distances along the optical path, this means of adjustment can be incorporated with particular ease and convenience in the design of any optical system of the type under discussion.

Many other modifications of the invention will readily suggest themselves to those skilled in the art. The invention, therefore, is not to be limited, except in so far as is necessitated by the prior art and by the spirit of the appended claims.

What is claimed is:

1. In an optical system for the recording, by means of a light beam, of electrical impulses on a film which moves at the recording point in a substantially vertical direction, a holder for holding reflecting means which act on said light beam, means supporting said holder for rotation about a substantially vertical axis, said reflecting means being rotatable about said axis by said rotation of said holder, means creating a torque for rotating said holder about said axis, and means acting in opposition to said torque for fixing said holder in any adjusted position about said axis.

2. In an optical system for the recording, by means of a light beam, of electrical impulses on a film which moves at the recording point in a substantially vertical direction, a holder for holding reflecting means which act on said light beam, said holder having a wedge-shaped recess, means acting as pivots for supporting said holder so that it may be rotated about said pivots thereby rotating said reflecting means about a substantially vertical axis, one or more spring backed balls pressing against said holder so as to create a torque for rotating said holder about said pivots, and a screw with a conical tip, said conical tip fitting against the inclined edge of said wedge-shaped recess and acting thereon in opposition to said torque, thereby fixing said holder in a position which can be adjusted by turning said screw.

3. In an optical system for the recording, by means of a light beam, of electrical impulses on a film which moves at the recording point in a vertical direction, a substantially rectangular prism holder having a recess for holding a reflecting prism, and one or more openings through which said light beam may enter and leave said reflecting prism, means supporting said holder for rotation about an axis parallel to one of its edges, said axis being substantially vertical, means creating a torque for rotating said holder about said axis, and means acting in opposition to said torque for fixing said holder in any adjusted position about said axis.

ALEXANDER S. BLUMENFELD.